United States Patent [19]
Rotter

[11] 3,894,800
[45] July 15, 1975

[54] PROJECTOR

[76] Inventor: Johann Rotter, Ernst Thunstrasse 6, A 5020 Salzburg, Austria

[22] Filed: Apr. 9, 1973

[21] Appl. No.: 348,999

[30] Foreign Application Priority Data
Apr. 11, 1972 Austria ............................ 3115/72

[52] U.S. Cl. ...................... 355/45; 355/46; 355/66
[51] Int. Cl. .......................................... G03b 35/18
[58] Field of Search ............ 355/45, 49, 46, 65, 66, 355/60; 353/78, 119

[56] References Cited
UNITED STATES PATENTS

| | | | |
|---|---|---|---|
| 1,979,719 | 11/1934 | Weisse | 355/45 X |
| 2,744,443 | 5/1956 | Hegonnet et al. | 355/45 X |
| 3,257,899 | 6/1966 | Hoyt | 355/45 X |
| 3,652,157 | 3/1972 | Blackert | 355/49 |
| 3,697,176 | 10/1972 | Kerehnle | 355/45 |
| 3,709,603 | 1/1973 | Furuichi | 355/60 |
| 3,715,155 | 2/1973 | Grupp | 353/78 |
| 3,728,020 | 4/1973 | Abrams et al. | 355/65 X |
| 3,733,128 | 5/1973 | Naumann et al. | 355/45 |
| 3,734,605 | 5/1973 | Yevick | 355/45 X |

*Primary Examiner*—Samuel S. Matthews
*Assistant Examiner*—E. M. O'Connor
*Attorney, Agent, or Firm*—Woodhams, Blanchard and Flynn

[57] ABSTRACT

A projector comprising an original plane in or on which an original may be disposed, an optical system for receiving an image of the original and consisting of two image-forming optical elements e.g. a zoom lens and an eyepiece, at least one of which has a variable focal length, and a final image plane at which a final image of the original is formed. Two reflecting surfaces, e.g. mirrors, lie between the optical system and the final image plane and are arranged to deflect the incident beam thereon into a position in which a marginal ray of the emergent beam therefrom lies at least substantially parallel to the direction of the optical axis of the optical system.

16 Claims, 6 Drawing Figures

PROJECTOR

This invention relates to projectors.

The term "projector" is used herein in its most general sense to include optical apparatus which produce an image of an original, disposed in a first plane, at a second plane which is removed from the first plane. Thus the image may be formed on a screen, a table plate, photosensitive material, etc.

The conventional projectors have an optical system consisting of a single optical element and so are suitable only for the projection on a screen of images of the same size of originals the same size.

In constrast thereto, the present invention seeks to provide a projector which can be used not only for conventional projection but also for the projection of images of different sizes of originals of the same size or for the projection of images of the same size of originals of different sizes, or for the projection of images of originals in different planes, etc.

According to the present invention there is provided a projector comprising: an original plane in or on which an original may be disposed; an optical system for receiving an image of the original and consisting of at least two image-forming optical elements, at least one of which has a variable focal length; a final image plane at which a final image of the original is, in operation formed by the optical system; and at least two reflecting surfaces which lie between the optical system and the final image plane, the reflecting surfaces being arranged to deflect the incident beam thereon into a position in which a marginal ray of the emergent beam therefrom lies at least substantially parallel to the direction of the optical axis of the optical system.

The fact that the projector according to the present invention has two optical elements of which at least one is of variable focal length, makes it possible to obtain a beam having a relatively small diameter over a substantially longer distance.

Preferably, the optical system is such ($a$) as to form a real intermediate image between the two optical elements, and ($b$) that the distance between the original plane and the plane of the real intermediate image is constant.

An arrangement such as this makes it possible to select various sizes of originals while the distance between the original plane and the real intermediate image plane is constant, without any variation of the optical system being required. If the rays cross at the optical system, a maximum narrowing of the beam is permitted and retardation of the divergence of the beam to such an extent that triple reflection is possible on a relatively shorter path, such as is necessary, for example, when changing between paper and film as photographic medium.

Preferably, one of the optical elements is interchangeable or displaceable so that the distance of the final image plane from the optical system and/or the diameter of the final image is variable.

A further reflecting surface may be disposed in the optical part between the original plane and the optical system, the original plane lying substantially parallel to the optical axis of the optical system. Thus if the projector stands on a table and the user of the projector sits in the normal position at this table, the screen may be situated at the physiologically correct distance and with a suitable inclination in front of him, while on the other hand the user can conveniently adjust by hand the position of an original disposed in the original plane parallel to the table.

The projector may include at least one further original plane and at least one further final image plane, the arrangement being such that, in operation, the ray flux between the original plane and the final image plane is selectively deflected by the reflecting surfaces.

If the final image plane is a screen or photosensitive material or transparent material, a reflecting mirror and a roof prism may be arranged to be alternately inserted into the optical ray flux.

One of the reflecting surfaces may be mounted for pivotable movement about the optical axis, means being provided for securing said reflecting surface in any one of a plurality of positions. In one embodiment, a roller member is provided, the roller member being rotable about its axis and having a plurality of helically offset reflecting mirrors, the roller member being arranged to permit the reproduction of miniature images of uniform size and uniform sharpness disposed linearly in line on the final image plane, an optical device being provided for optically compensating for the difference in path length of the various ray fluxes from the roller member.

The optical system may be so arranged that the original plane is usable as a final image plan and the final image plane is usable of the original plane.

One of the optical elements may be an eyepiece and one of the reflecting surfaces may be pivotable out of the optical path so that the original may be viewed through the eyepiece or a camera, placed in the main plane of the eyepiece, can take a photograph of the original.

The projector may include a further optical system arranged so that an image of a further original may be formed on the final image plan. The further optical system may comprise a lens and two reflecting surfaces.

The invention as illustrated, merely by way of example, in the accompanying drawings, in which.

Figure 1:
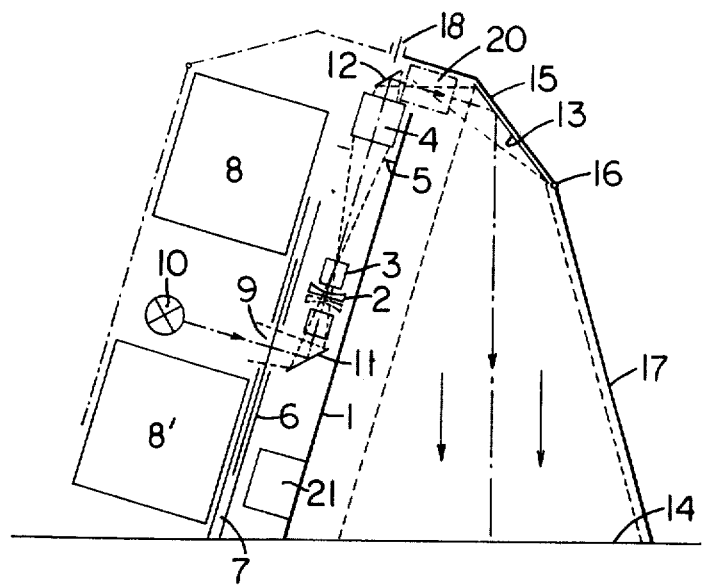
FIG. 1 is a diagrammatic vertical section of a projector according to the present invention.

Referring first to FIG. 1 there is shown a projector according to the present invention. The projector is a so-called "pocket" instrument, that is to say, the dimensions of the projector are such that, in a collapsed condition it can be packed and transported in a briefcase. The projector enables all conventional microfilm sizes, between 58.8mm and 10.4mm, to be read and reproduced in a uniform or standard reduced size. In addition, the projector can be used to form a portable microfilm apparatus for reproducing texts, for example, from books.

The projector has an optical system, mounted on a support 1, consisting of a zoom lens having elements 2, 3 and a 10.4 × magnification zoom eyepiece 4 which has a fixed intermediate image plane 5. A flat original 6, for example a microfilm, is situated in a guide 7 which extends parallel to the longitudinal direction of the optical system. Whilst in many cases it is sufficient to provide the guide 7 as a holder for an original, in other cases cassettes 8,8' may be provided so that a film can be unwound from a spool in the cassette 8 through the guide 7 and received on a spool in the cassette 8'. A lamp 10 is arranged to illuminate the original. The ray flux passes from the lamp 10 through the optical 6 onto a first mirror 11 which deflects it through 90° into the optical system. A second mirror 12 reflects the incident beam or ray flux emerging from the optical system to a third mirror 13 from which the emergent beam or ray flux is deflected, at an acute angle, in a direction so that a marginal ray thereof lies substantially parallel to the optical axis of the optical system, on to a table plate 14, where a projection screen may also be provided. The third mirror 13 is mounted on a holder 13 which is hinged at a joint 16 to a supporting rod 17, which extends dowardly to the table plate 14, when te projector is in a position of use as illustrated and which supports the arrangement. The third mirror 13, the holder 15, and the rod 17 are pivotable through an angle of 180° about a pin 18 mounted on the support 1 and lying on the optical axis of the optical system 2–4, and thus can be brought (with pivoting of rod 17 on joint 16) into the position shown in dot-dash lines at the left edge of FIG. 1, so that the projector is in the collapsed position.

Between the second mirror 12 and the third mirror 13 a subminiature camera 20 can be inserted, with its lens lying with its principal point in the Ramsden circle of the zoom eyepiece 4 and therefore being in a position which permits a subminiature photograph to be taken. If the camera is not in use it is stored in a container 21 on the support 1 at a position where it does not interfere with or obstruct the optical system.

If the cassettes 8,8' are not provided it has been found possible to make a projector of this type measuring only 34 × 15 × 5 cm.

Figure 2:
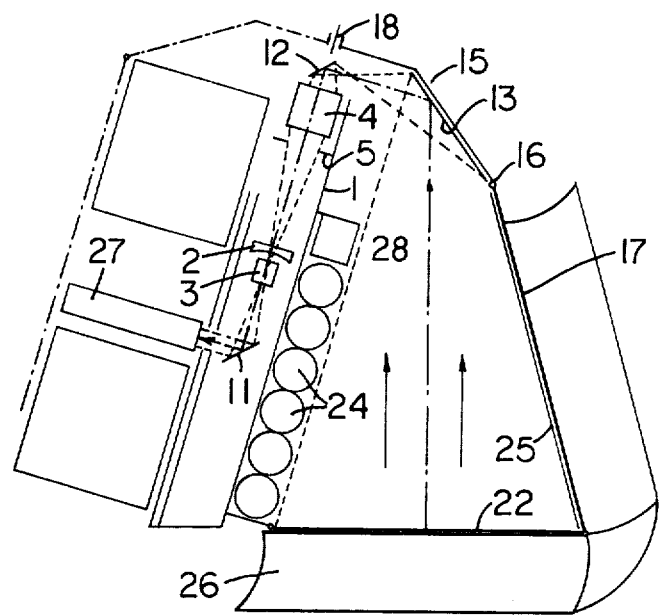
FIG. 2 shows a modification of the projector of FIG. 1.

In FIG. 2, a modification of the projector of FIG. 1 is shown which enables it to be converted into a microfilm camera for macro originals. To this end a glass plate 22, for example, 21 × 30 cm in size is provided. Adjacent one of the longer sides of the glass plate 22 is a lamp panel 24 and adjacent the other side is a mirror 25. The lamp panel 24 and the mirror 25 are connected to the remainder of the projector by the rod 17. In operation, the glass plate 22 is placed on an original 26 to be photographed, for example, a page of a book. The lamp panel 24 and the mirror 25 illuminate the original. By means of the mirrors 12, 13 the zoom eyepiece 4 receives an image of the original and directs it through the optical system and the mirror 11 to a subminiature film in a cassette 27, which is mounted in a support (not shown). An operating battery 28 is provided adjacent the lamp panel 24. This projector can, in a collapsed position, also be packed in a briefcase.

Figure 3:
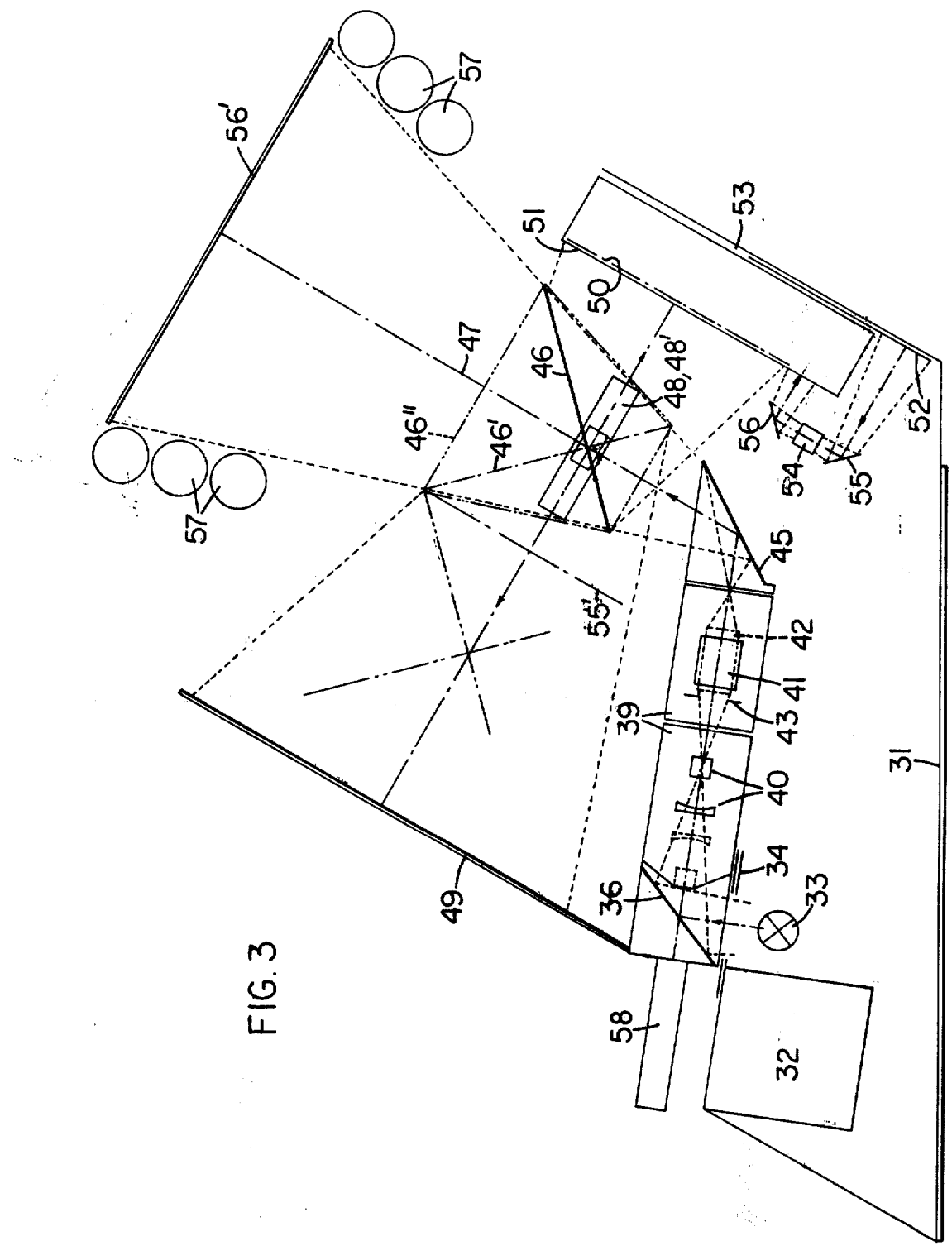
FIG. 3 is a diagrammatic elevational view of another embodiment of a projector according to the present invention.

A projector according to the present invention is illustrated diagrammatically in FIG. 3 may be used for the reproduction of conventional transparent microoriginals of a size between 58.8mm and 10.4mm in diameter, and, in certain circumstances, also substantially smaller sizes, may be used for the remagnification of micro-originals so that they can be viewed and read by the naked eye on a screen; for reproduction of the micro-originals on index cards of DIN A5 size with additional data, may be used for the transfer of microfilms of conventional size and in all conventional forms, e.g. rolls, strips, cut film, etc., to a standard miniature size; and may be used for the microfilming of macro-originals of all conventional text sizes up to a diameter of 362mm, including books, in any one of six selectable miniature sizes, but preferably on 16mm film.

The projector shown in FIG. 3 rests on a base plate 31 on which a casing of the projector is erected. Adjacent the base plate, the casing carries a holder 32 which is suitable for receiving a microfilm cassette. Adjacent the holder 32 there is a lamp 33 which illuminates a transparent original contained in a holder 34 and the plane of which is also the original plane of an optical system. The image of the illuminated original falls on a mirror 36, which is pivotable out of the optical path but normally deflects the ray flux, coming from the original through substantially 90° towards the optical system. The optical system is disposed in a casing 39 and consists of a multi-element zoom lens 40 and an eyepiece 41. The eyepiece 41 is interchangeable with other different eyepieces such as the eyepiece 42 shown in broken lines. At a fixed position between the zoom lens 40 and the eyepiece 41 there is a real intermediate image plane 43.

The ray flux from the optical system impinges on a mirror 45, which reflects it through an angle of about 120° when it impinges on a third mirror 46. The mirror 46 is pivotable about an optical axis 47 of the ray flux reflected by the mirror 45 and can be secured in a plurality of different positions. In the position of the mirror 46, shown in solid lines, the ray flux is deflected to the right (as seen in FIG. 3) through about 90° and impinges upon a photosensitive material 50. It will be seen that a marginal ray of the ray flux from the mirror 46 is substantially parallel to the optical axis of the optical system. The position of the photosensitive material 50 is in an image plane 51 of the optical system so that a sharp image is obtained. In a position 46' (shown in dot-dash line) of the mirror 46, the ray flux is deflected to the left (as seen in FIG. 3) through 90° and impinges on a reading screen 49, which is inclined at an angle of 60° relative to the base plate. The reading screen 49, therefore, is in a favourable reading position for the user of the projector. The optical system is adjusted so that a sharp image of the original appears on the reading screen 49.

The positions of the mirror 46 are achieved by pivoting the mirror through 180° about the optical axis 47. Further positions of the mirror 46 can also be achieved, for example, a position where the mirror 46 is pivoted through 90° or a position 46" where the mirror is pivoted through 270°, in which position the mirror appears trapezoidal in shape in the drawing. In these positions, the ray flux is deflected through 90° or 270° respectively, but in a direction which is at right angles to the plane of FIG. 3. WIth either of these positions there may be associated a miniature film cassette 48, 48' for the taking of miniature photographs of uniform size after the eyepiece 41 has been replaced by the eyepiece 42. One cassette 48 may contain black and white film and the other cassette 48' may contain colour film.

It is also possible for the mirror 46 to be pivoted about an axis 55' to the position shown in dot-dash lines, for the following purpose. At the top edge of the casing a glass plate 56' is disposed, this glass plate serving as a support for macro-originals, for example, a page of a book. Adjacent one side of the glass plate are lamps 57 to illuminate the original lying on the glass plate 56'. When the mirror 36 is pivoted out of the optical path and a micro film cassette 58 is brought into line with the optical axis of the optical system, a microfilm photograph can be taken on the original on the glass plate 56'.

In an image plane 51 there is also disposed a device which serves to mark data on the reproduction made on the photosensitive material 50. On the outer side of the casing a guide 53 contains at least one sheet 52 with the data thereon, the or each sheet being longitudinally slidable in the guide. The image of a downwardly projecting part of the sheet 52 is reflected by a mirror 55 and the ray flux passes to a zoom lens 54 and onwards to a mirror 56. The mirror 56 projects an image of the edge of the sheet 52 onto the photosensitive material 50 where it is reproduced. A lighting device required for this purpose is not shown in FIG. 3. The arrangement of the mirrors 55, 56 and the zoom lens 54 enables the guide 53, which requires a relatively large space, to be accommodated in a space saving manner on the outside of the casing. One of the mirrors 55,56 may be replaced by a prism as shown for example at 76 on the corresponding portion of FIG. 6.

Figure 4:
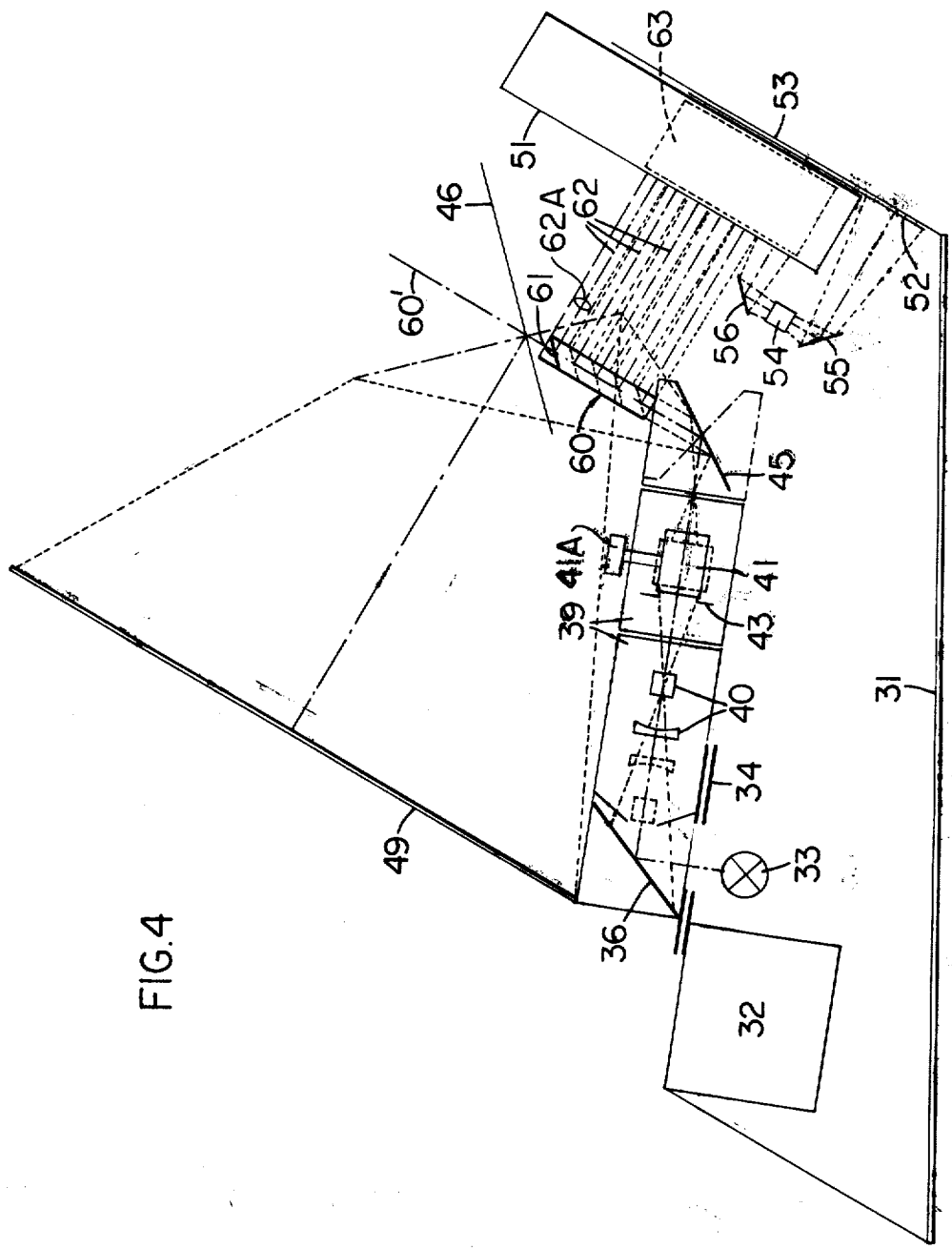
FIG. 4 shows a modification of the projector of FIG. 3.

A modification of the projector of FIG. 3 is shown in FIG. 4. The ray flux passes from the original, which is situated in the holder 34, through the mirror 36 and the optical system to the mirror 45, and reflected upwardly (as seen in FIG. 4) at an obtuse angle. The ray flux does not, however, impinge on the mirror 46 but on a mirror roller 60 inserted into the optical path. The mirror roller comprises five mirrors 61 offset helically in relation to one another and brought successively into the optical path which is co-axial with the axis 60' of the roller. Each of the five mirrors 61 deflects the ray flux through 90° so that it impinges on the photosensitive material which is contained in a cassette 63 and which is wound from one spool and onto another spool. The photosensitive material lies in the image plane for the ray flux coming from the mirror roller. The individual images projected by the mirrors 61 during rotation of roller 60 about its rotational axis 60A, onto the photosensitive material are aligned side by side in a row. On completion of a row of images the photosensitive material in the cassette is displaced in a stepwise manner transversely to the row of images, so that two dimensional grouping of the images in question on the photosensitive material is possible. With the aid of the mirrors 55, 56 and the zoom lens 54, data which can be read by the naked eye is reproduced photographically on the free edge of the photosensitive material. Finally, a device is provided which optically compensates for the differences in the length of the various ray fluxes passing through the mirror roller 60. This can, for example, be achieved by stepwise adjustment of the eyepiece 41 as by any convenient means diagramatically indicated at 41A or alternatively, for example, by means of various compensating lenses (one being shown at 62A in FIG. 4, for purposes of example) in the optical path of each individual mirror 61.

Figure 5:
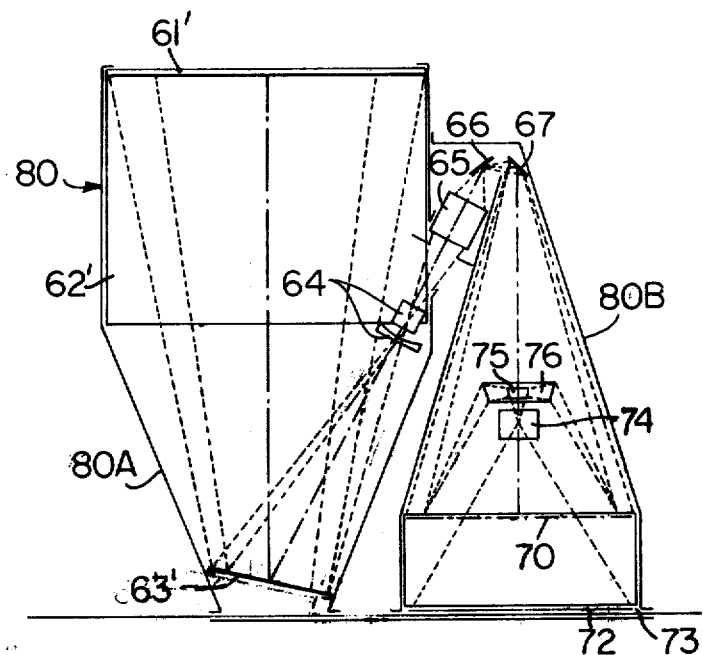
FIG. 5 is a diagrammatic elevational view of another embodiment of a projector according to the present invention suitable for the reproduction of macro originals.
Figure 6:
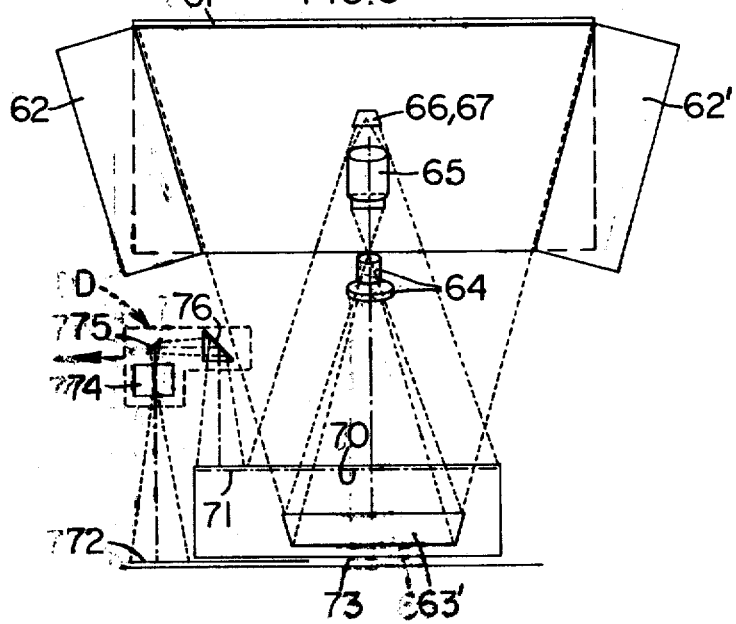
FIG. 6 is a side view of the projector of FIG. 5.

FIGS. 5 and 6 illustrate diagrammatically another embodiment of a projector according to the present invention which may be used for the reproduction of macro-originals. A casing 80 of the projector has a first tunnel-shaped part 80A, which at the top is closed by a glass plate 61' serving to support a macro-original, for example, a page of a book. Adjacent the glass plate 61', at 62', lamps are provided for illuminating the original from below. At the lower end of the tunnel-shaped part there is situated a mirror 63' which is inclined slightly in relation to the horizontal to reflect the ray flux from the macro-original upwardly in a steeply inclined direction. The ray flux then enters a two stage optical system which consists of a zoom lens 64 and a zoom eyepiece 65. The eyepiece 65 is immediately followed by mirror elements 66, 67 for example, two mirrors (or alternatively a roof prism, as at 66', 67' in FIG. 6A) which lie close to one another in the optical path and which deflect the ray flux downwardly into a second tunnel-shaped part 80B of the casing 80. A marginal ray of the ray flux from the mirror elements 66, 67 is substantially parallel to the optical axis of the optical system. At the lower end of the second tunnel-shaped part is disposed photosensitive material 70 contained in a cassette. This photosensitive material is preferably of a size 124 × 175mm (DIN A5). By suitable adjustment of the optical system it is possible to reproduce at least two different macro sizes, namely (1) foolscap (33 × 21 cm), which is DIN A4, and (2) DIN A5, on photographic material of uniform size (DIN A5).

A marginal strip 71 of the photosensitive material 70 is left free for data relating to the original. This data is reproduced from data on areas of a sheet 72 disposed in a guide 73 on the lower side of the cassette containing the photosensitive material 70. The image of the data on the sheet 72 is reproduced via a mirror 75, a lens 74 and a prism 76 on the strip 71. If the mirror 75, lens 74 and prism 76 are dispensed with and if the photosensitive material and the cassette containing it are moved to the right (as seen in FIG. 6) and if the magnification of the eyepiece is changed from 8.7 × 10.4 ×, it is possible for originals of the sizes DIN A4 and DIN A5 to be reproduced without data being shown thereon, as an image of uniform size on a sheet size of DIN A5.

I claim:

1. A projector comprising:
a first original plane on which an original may be disposed and a light source for projecting an image of the original; an optical system for receiving the projected image of the original and defining an optical axis; said optical system comprising at least two image-forming optical elements on said optical axis, at least one of which optical elements has a variable focal length; alternately selectable first and second final image planes at which final images of the original are formed by the optical system; said image forming elements lying in series on said optical axis and between the original plane and the selected final image plane; at least two reflecting surfaces, said optical system and said two reflecting surfaces defining a light path between the original plane and the selected final image plane, said two reflecting surfaces following said optical system along said light path, the reflecting surfaces being arranged to deflect the incident beam thereon alternatively to said first and second final image planes, respectively, wherein a marginal ray of the emergent beam from said reflecting surfaces to at least one said final image plane lies at least substantially parallel to the optical axis between the first and second image-forming elements of the optical system.

2. An apparatus as claimed in claim 1 including a real intermediate image plane between the two optical elements, the distance along the light path between the original plane and the plane of the real intermediate image being constant.

3. A projector as claimed in claim 1 including at least one further original plane and at least one further final image plane, reflector means normally positioned for reflecting the light flux from first said original plane to said optical system and interposed in light blocking relation in the light path between said further final image plane and said optical system, the one of said reflecting surfaces nearest selected first to or said final image plane normally being interposed in light blocking relation in the light path between the other said reflecting surface and said further original plane, said reflector means and one reflecting surface being pivotable out of said light blocking relation, said further planes being aligned with the light path through said optical system and the remaining one of said reflecting surfaces.

4. A projector as claimed in claim 1 in which the one of the reflecting surfaces nearest said first final image plane is mounted for pivotable movement about the light path from the other reflecting surface to any one of a plurality of positions and including further final image planes in further light paths from said one reflecting surface and corresponding to ones of said positions.

5. A projector as claimed in claim 1 in which said optical elements are an eyepiece and a zoom lens, and in which the one of the reflecting surfaces most remote from the optical system is pivotable out of said optical path, a transparent support plate for macro-originals disposed on an extension of said light path from the other of said reflecting surfaces and means for illuminating a macro-original disposed on said said support plate, and film means on said light path near said first original plane for photographing said macro-original upon transmission of the macro-original image along said light path past said other reflecting surface and said optical system to said film means.

6. A projector as claimed in claim 1 in which the first original plane lies parallel to the optical axis of the optical system and a further reflecting surface is provided in the light path between the original plane and the optical system, the further reflecting surface being arranged to effect deflection of the image of the original through substantially 90°.

7. A projector as claimed in claim 6 in which the further reflecting surface and the one of the first mentioned reflecting surfaces furthest from said optical system are pivotable out of the light path on which the optical system and the other first mentioned reflecting surfaces are disposed.

8. A projector as claimed in claim 1 introducing means at said first final image plane for supporting photosensitive material for reproduction of the final image of the original and means defining a viewing screen at said second final image plane for permitting viewing of said final image of said original.

9. A projector as claimed in claim 8 including a second original plane adjacent said first final image plane, a second image forming optical system in a further optical path coupling said second original plane and first final image plane for receiving an image of a second original disposed in said second original plane, said second optical system being aimed at a portion of the margin of photosensitive material disposed at said first final image plane, and means for locating on said second original plane bibliographic data corresponding to an original at the first original plane for reproduction on said photosensitive material margin at said first image plane.

10. A projector as claimed in claim 9 in which the second optical system comprises a lens and two reflecting surfaces.

11. A projector comprising: an original plane on which an original may be disposed and a light source for projecting an image of the original; an optical system for receiving the projected image of the original and defining an optical axis; said optical system comprising at least two image-forming optical elements on said optical axis, at least one of which optical elements has a variable focal length; a final image plane at which a final image of the original is formed by the optical system; said image forming elements lying in series on said optical axis and between the original plane and the plane of the final image; at least two reflecting surfaces, said optical system and said two reflecting surfaces defining a light path between the original plane and the final image plane, said two reflecting surfaces following said optical system along said light path, in which the last one of said reflecting surfaces comprises a roller member, the roller member being rotatable about its axis and having a plurality of helically offset reflecting mirrors, the roller member being arranged to permit the reproduction of miniature images of uniform size and uniform sharpness disposed linearly in line on the final image plane, means being provided for optically compensating for the difference in path length of the various ray fluxes from the roller member.

12. A projector comprising: an original plane on which an original may be disposed and a light source for projecting an image of the original; an optical system for receiving the projected image of the original and defining an optical axis; said optical system comprising at least two image-forming optical elements on said optical axis, at least one of which optical elements has a variable focal length; a final image plane on which a final image of the original is formed by the optical system; said image forming elements lying in series on said optical axis and between the original plane and the plane of the final image; at least two reflecting surfaces, said optical system and said two reflecting surfaces defining a light path between the original plane and the final image plane, said two reflecting surfaces following said optical system along said light path, the reflecting surfaces being arranged to deflect the incident beam thereon into a position in which a marginal ray of the emergent beam therefrom lies at least substantially parallel to the optical axis between the first and second image-forming elements of the optical system, including a support on which the optical system and one of the two reflecting surfaces are mounted, means including the remaining reflecting surface and a support rod pivoted on the support and being pivotable through substantially 180° about said optical axis of said optical system so that the projector may achieve a collapsed condition.

13. A projector as claimed in claim 12 including an auxiliary device for converting the projector into a microfilm camera, the auxiliary device comprising a transparent plate and an illuminating device mounted on said plate for illuminating an original, the transparent plate being mountable in the final image plane, and a holder for a microfilm cassette, the holder being disposed so that the microfilm is in the plane at which the final image of the original on the transparent plate is formed.

14. A projector as claimed in claim 13 in which the auxiliary device includes a mirror for increasing the illumination of the original.

15. A projector as claimed in claim 12 in which the original plane comprises a guide for a transparent original and lies parallel to the optical axis of said optical system, and including a surface at the final image plane sized to receive the projected image of the transparent original.

16. A projector comprising: an original plane on which an original may be disposed and a light source for projecting an image of the original; an optical system for receiving the projected image of the original and defining an optical axis; said optical system comprising at least two image-forming optical elements on said optical axis, at least one of which optical elements has a variable focal length; a final image plane at which a final image of the original is formed by the optical system; said image forming elements lying in series on said optical axis and between the original plane and the plane of the final image; at least two reflecting surfaces, said optical system and said two reflecting surfaces defining a light path between the original plane and the final image plane, said two reflecting surfaces following said optical system along said light path, the reflecting surfaces being arranged to deflect the incident beam thereon into a position in which a marginal ray of the emergent beam therefrom lies at least substantially parallel to the optical axis between the first and second image-forming elements of the optical system, a casing with a first tunnel-shaped part, a transparent plate forming the original plane at the end of said first tunnel-shaped part, illuminating means for illuminating the original on the transparent plate, and a mirror for receiving an image of the original and deflecting the ray flux to the optical system, the reflecting surfaces being arranged to deflect the ray flux from the optical system to a second tunnel-shaped part of the casing having the final image plane at the end thereof for receiving photosensitive material.

* * * * *

UNITED STATES PATENT OFFICE
CERTIFICATE OF CORRECTION

Patent No. 3,894,800          Dated July 15, 1975

Inventor(s) Johann Rotter

Figure 6A:
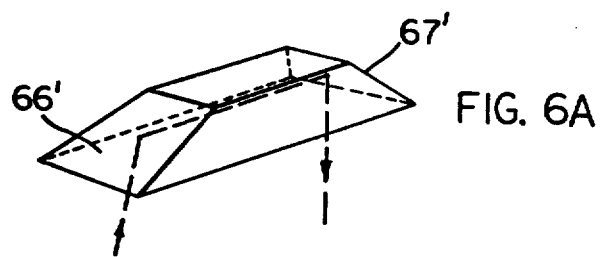
FIG. 6A is an oblique view of a roof prism useable in the embodiments of FIGS. 5 and 6.
Figure 4A:
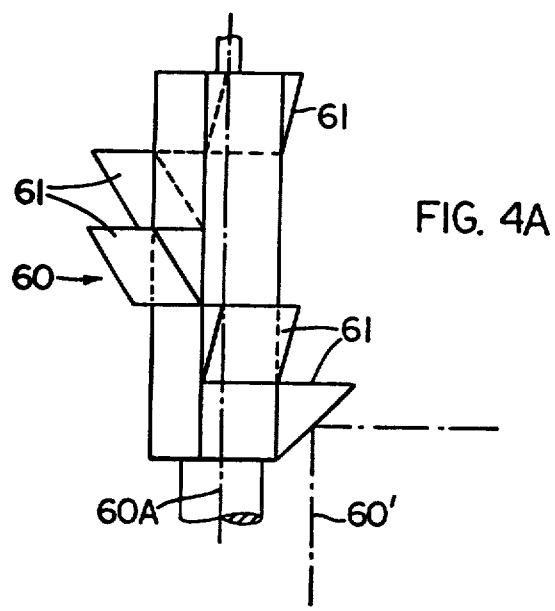
FIG. 4A is an elevation view of a mirror roller useable in FIG. 3.

It is certified that error appears in the above-identified patent and that said Letters Patent are hereby corrected as shown below:

In the drawings, the attached Figures 4A and 6A should be added.

Signed and Sealed this

Third Day of April 1979

[SEAL]

Attest:

RUTH C. MASON
Attesting Officer

DONALD W. BANNER
Commissioner of Patents and Trademarks